UNITED STATES PATENT OFFICE.

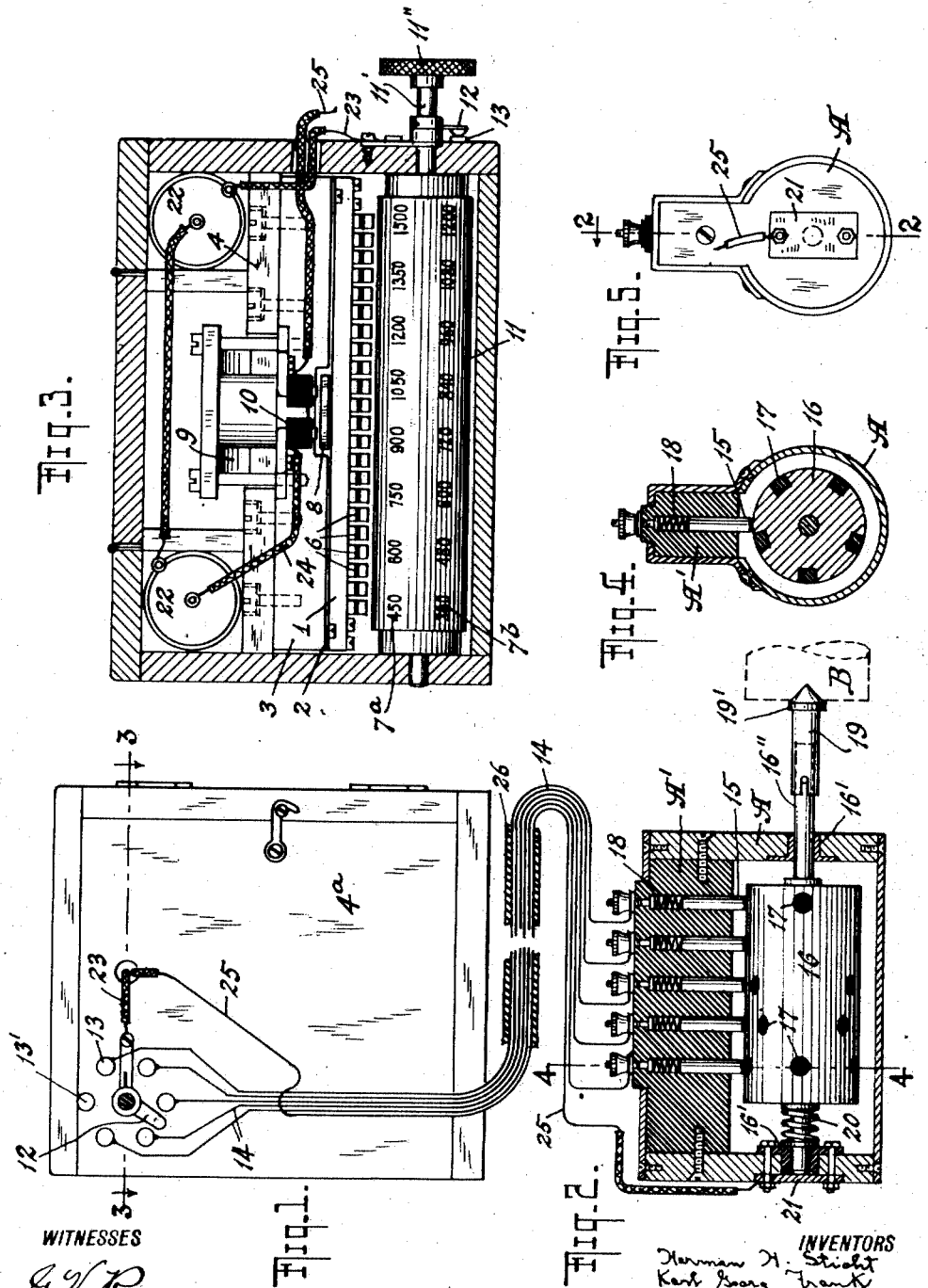
H. H. STICHT AND K. G. FRANK.
ELECTRICAL VIBRATOR, PARTICULARLY FOR TACHOMETERS.
APPLICATION FILED MAR. 7, 1919.
1,315,646. Patented Sept. 9, 1919.
2 SHEETS—SHEET 1.

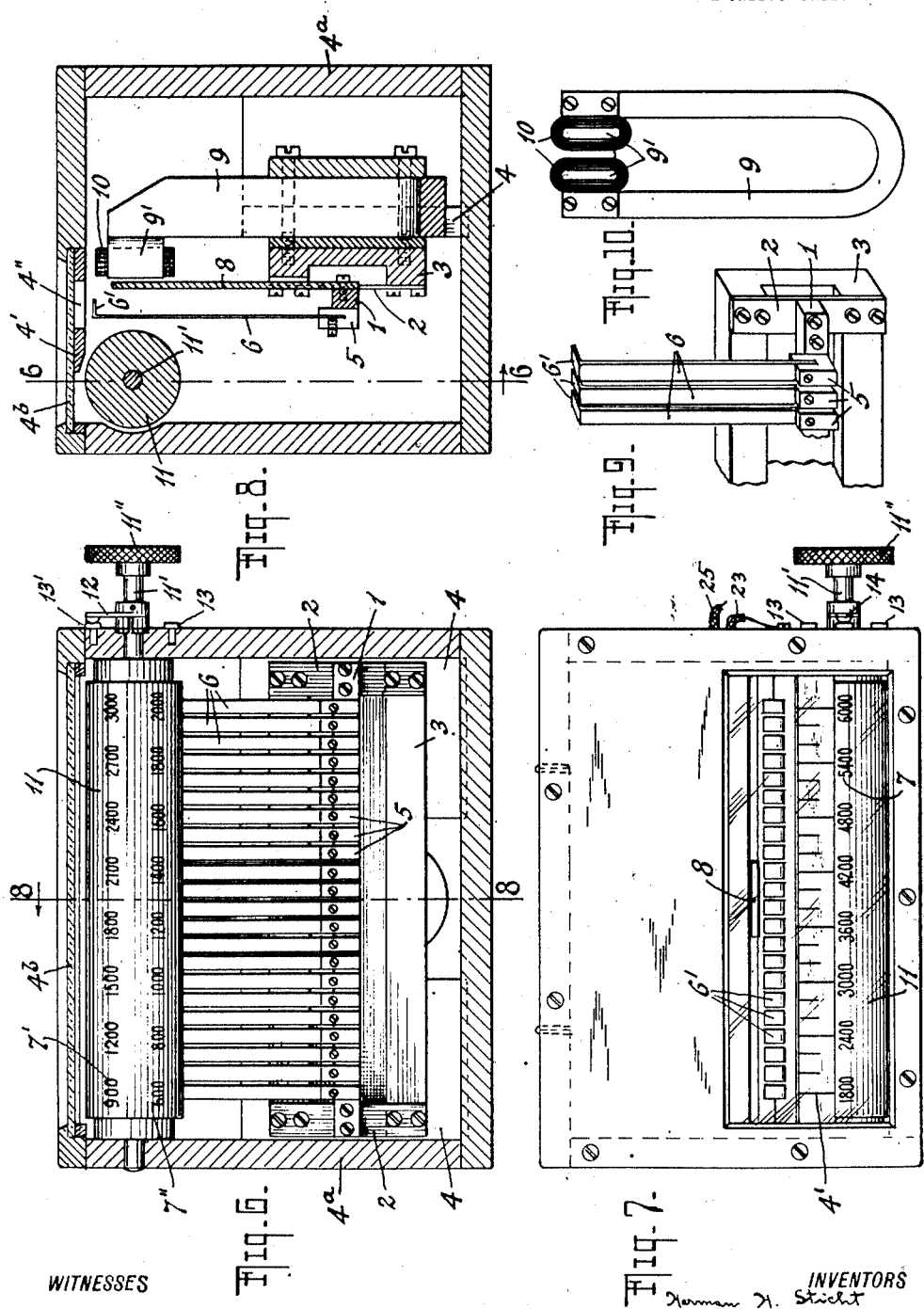

HERMAN H. STICHT, OF WOODHAVEN, NEW YORK, AND KARL GEORG FRANK, OF WYOMING, NEW JERSEY, ASSIGNORS TO AMERICAN PRECISION WORKS, OF NEW YORK, N. Y., A CORPORATION OF NEW YORK.

ELECTRICAL VIBRATOR, PARTICULARLY FOR TACHOMETERS.

1,315,646.

Specification of Letters Patent.

Patented Sept. 9, 1919.

Application filed March 7, 1919. Serial No. 281,260.

*To all whom it may concern:*

Be it known that we, HERMAN H. STICHT and KARL GEORG FRANK, both citizens of the United States, and residents of Woodhaven, Queens county, State of New York, and Wyoming, Essex county, State of New Jersey, respectively, have invented certain new and useful Improvements in Electrical Vibrators, Particularly for Tachometers, of which the following is a specification.

Our invention relates to devices in which variations such as those of an alternating, pulsating, or intermittent current are utilized to actuate reeds or vibrators provided in sets, the particular reed whose rate of vibration corresponds to the frequency of such current variations, vibrating more strongly than the others and thus furnishing an indication of such frequency. When this principle is utilized in a tachometer, the moving (rotary) part whose speed is to be measured, is caused to produce the current variations which are measured by the reeds and which bear a definite relation to the speed of said moving part.

The object of our invention is to provide a very simple and efficient device of the character indicated, and particularly to so construct the apparatus as to greatly increase its range of action without increasing the number of reeds or vibrators.

A specific example of our invention is illustrated in the accompanying drawings, in which Figure 1 is an end view of a casing containing one section of a tachometer embodying our improvements; Fig. 2 is a section on the line 2—2 of Fig. 5, showing another section of the device; Fig. 3 is a horizontal section on line 3—3 of Fig. 1; Fig. 4 is a cross section on line 4—4 of Fig. 2; Fig. 5 is a corresponding end view; Fig. 6 is a vertical section on line 6—6 of Fig. 8; Fig. 7 is a corresponding plan view; Fig. 8 is a vertical section on line 8—8 of Fig. 6; Fig. 9 is a perspective view showing a few of the vibrating reeds and the manner of supporting them; and Fig. 10 is a front elevation of the electromagnet for vibrating the reeds.

The transverse bar 1 has its ends secured to the central portions of parallel supporting springs 2, the ends of which are fastened to a channel bar 3 attached to the base or frame 4. On one side, the bar 1 carries rigidly a number of blocks or sockets 5, to which are secured the ends of reeds or vibrators 6, the other or free ends of which, 6', form pointers adapted to indicate on a normally stationary scale, such as 7. For instance, there might be twenty-two (22) reeds, differing in thickness or in some other feature so as to secure a different normal rate of vibration for each of them, say 30 vibrations per second for one tongue or reed, the next $33\frac{1}{3}$, the third $36\frac{2}{3}$, the fourth 40, and so on, thus increasing at the rate of $3\frac{1}{3}$ vibrations per second for each successive reed, so that the last would have a normal rate of 100 vibrations per second.

To the bar 1 is further secured a piece 8 of magnetizable material, say a strip of soft spring steel, adjacent to the pole pieces 9' of a stationary magnet 9, secured to the frame 4. The strip 8 acts as an armature for the magnet 9, and should come close to, but not in contact with, the pole pieces 9'. The springs 2 tend to hold the bar 1 with the reeds 6 and armature 8 in the normal position with the armature slightly away from the pole pieces 9'. These pole pieces carry insulated wire coils 10, connected with each other and also connected with the circuit, as will be set forth below.

For a purpose to be stated hereinafter, the scale 7, while normally stationary, may be moved out of registry with the pointers 6' so as to enable another scale to be brought into coöperation with said pointers. In the example illustrated, the scale 7 is on a cylindrical body or member 11, having a shaft 11' journaled in the frame or casing 4ª, the projecting end of said shaft having a knob or head 11'' for adjusting it as desired. Thus, instead of the scale 7 which is shown in operative position in Fig. 7, any one of the other scales provided on said cylindrical member 11 and extending lengthwise thereof may be placed in registry with the pointers 6'. In the example shown the cylinder 11 is assumed as having five such scales, 7, 7', 7'', 7ª and 7ᵇ. The frame 4 may be provided with a graduation 4' (without numbers) adjacent to the slot or window 4ᵇ through which the scale in use at the time is visible. The pointers 6' show through a neighboring slot 4''.

The shaft 11 also carries rigidly a switch 12 adapted to engage stationary contacts 13 secured to the frame 4ª in such positions that every time the shaft is given a partial rotation to bring another scale into operative position, the switch 12 will be brought against a different contact 13. If desired we may also provide an idle or dead button 13' to be engaged by the switch 12 in a position when none of the scales is in operative position and when none of the circuits hereinafter referred to is closed. The scales 7, 7', 7", etc., are all different from each other, as to numbering, but all of the same longitudinal position and extent so that each of them may register properly with the graduation 4' and with the pointers 6'. For instance, one of the scales (7ᵇ) may be numbered from 360 to 1200, the next (7ª) from 450 to 1500, the third (7") from 600 to 2000, the fourth (7') from 900 to 3000, and the fifth (7) from 1800 to 6000; but in each case the numbers of each scale will bear a definite proportional relation to those of the other scales, and specifically, all the numbers of any one scale will be like multiples or submultiples of the corresponding numbers of a particular one of the other scales. Thus, in the example just given, taking the numbers of the last scale as the unit, those of the fourth, third, second and first scales are respectively one-half, one-third, one-fourth and one-fifth of the numbers of such unit scale. Of course, we do not wish to restrict ourselves to this particular ratio of the several scales.

To enable this device to operate as a revolution counter, we have provided the following additional parts: Each of the contacts 13 is connected, by a wire 14, to a conducting plunger or brush 15 mounted in a suitable portion A' of a housing A, and adapted to engage a rotary interrupter cylinder 16, journaled in suitable bearings indicated at 16'. The plungers or brushes 15 are insulated from each other, and the cylinder surface engaged by their inner ends is of conducting material, but within said surface are provided interrupting spots or members 17 of insulating material, in five planes of rotation corresponding to the location of the brushes, so that each brush will engage only the interrupter member or members of its own set. The number of such members in each set will correspond inversely to the numerical ratio between the numbers of the several scales on the cylinder 11. Thus, with the particular arrangement of scales described above, one of the brushes or plungers 15 would have only one interrupter member 17 corresponding to it, there would be two members 17 in the plane of rotation corresponding to another brush 15, three members 17 in the plane of rotation corresponding to a third brush 15, four members 17 corresponding to a fourth brush, and five members 17 in the plane of rotation corresponding to the fifth brush 15. The members 17 of the same set would be spaced evenly on the circumference of the cylinder 16. Springs such as 18 may be employed to press the brushes or plungers 15 toward the cylinder 16, the plungers in this case having a sliding fit in the housing portion A'.

The shaft 16" is provided at one end with any suitable engaging device or attachment, such as a sleeve 19 held to turn with the shaft and having a point 19' for axial engagement with the rotary part B whose speed is to be measured. Preferably the shaft 16" and the cylinder 16 are mounted to move axially in the housing A, a spring 20 tending to project that end of the shaft which carries the point 19'. In this projected position the opposite end of the shaft 16" will be out of contact with a conducting plate or switch plate 21, so that normally there will be a gap in the circuit at this point. The interrupter members 17 are so located that their planes of rotation will not contain the brushes 15 until the shaft 16" and cylinder 16 have been pushed back to bring the inner end of said shaft into contact with the switch plate 21. This longitudinal movement of the shaft 16" is obtained by the operator's taking the housing A in his hand, bringing the point 19' axially against the shaft or other rotary part whose speed is to be measured, and pressing toward such part, so as to overcome the resistance of the spring 20.

The housing A is so formed that it may be held in the hand readily, while the frame or casing 4ª is in the nature of a portable box which may be set readily on a table, bench, floor, or other support. The connections between these two parts of the apparatus will be described presently.

At 22 we have indicated a source of electricity, say dry cells or a storage battery, for supplying the current to the magnet coils 10. This source of electricity is generally located within the casing 4ª. The magnet 9 may be a permanent magnet, but at least the pole pieces 9' should be of soft iron. The source of electricity 22 is placed in circuit with the switch 12, cylinder 16 and coils 10, in any suitable manner so that whenever the circuit is closed, the current will flow through said coils. For instance, one pole of said source 22 may be connected, by a wire 23, with the shaft 11' and therefore with the switch 12; the other pole of said source 22 is represented as connected, by a wire 24, with one terminal of the coils 10, the other terminal of these coils being connected with the contact plate 21 by a wire 25.

Preferably the wires 14 and 25 are contained in an insulating sheath 26 common to all of them, said sheath being flexible and of sufficient length to allow the housing A to be moved to such a distance from the casing 4ᵃ as may be required by conditions occurring in practice. The wires with their sheath form a cable, which in the particular example set forth would be a six-strand or six-conductor cable.

If an alternating, pulsating or intermittent current is sent through the coils 10, the pole pieces 9' will be magnetized periodically, attracting the armature 8 and causing it to vibrate, together with the spring-supported carrying bar 1, at a rate corresponding to the frequency or cycle of the current-waves or interruptions. The reeds 6 share this vibration of the bar 1, to which they are secured, but the particular reed whose own normal rate of vibration corresponds to said frequency or cycle, will, owing to a resonance effect, vibrate much more strongly than the other reeds, and will thus give a visible indication from which, in connection with a proper scale on cylinder 11, the rate of vibration can be determined, thus enabling the apparatus to be used for measuring the frequency or cycle of current impulses.

When the apparatus is employed for measuring the speed of a moving part, say a rotary shaft, the point 19' is brought against the end of such shaft axially, so that the shaft will rotate the interrupter cylinder 16 and will be brought against the switch plate 21. The source of electricity 22 will be connected with the circuit by turning the knob 11'' until the cylinder 16 brings to view, adjacent to the graduation 4', that particular scale the range of which includes the speed to be determined (this speed will generally be known approximately). Bringing this particular scale into operative position also insures contact between the switch 12 and the particular contact 13 which is related to said scale and to the corresponding member or set of members 17. That is to say, if the scale bearing the numbers from 450 to 1500 is brought to operative position (the numbers of this scale being the numbers of the "unit" scale, divided by 4), this will cause the switch 12 to engage the contact 13, the wire 14 of which leads to that plunger or brush 15 which is adapted to coöperate with the set containing four members 17. If the "unit" scale (with numbers from 1800 to 6000) is brought into play, this automatically connects the switch 12 with the plunger or brush 15 adapted to engage a single member 17, and a corresponding relation is obtained whenever another scale is turned to the operative position.

The operation will be readily understood: As the cylinder 16 rotates, all the plungers or brushes 15 are idle (electrically) except the one which at that time is in electrical connection with the switch 12. Let us assume that the "unit" scale, indicating from 1800 to 6000 revolutions per minute, is in operative position. The switch 12 will rest on the contact 13 connected with the plunger 15 adapted to engage the single member 17. In this case, the following circuit will be closed, once for each revolution of the shaft 16''; from one pole of source of electricity 22 through wire 23, switch 12, contact 13, wire 14, brush 15, cylinder 16, shaft 16'', contact plate 21, wire 25, coils 10, and wire 24 to the other pole of source 22. Now let us suppose that the shaft 16'' is rotating at 3000 revolutions per minute, as many electrical impulses (or 50 per second) will be sent through the coils 10, causing the armature 8 to vibrate at this rate, together with all the tongues 6, but the particular tongue or reed 6 whose own normal rate is 50 vibrations per second, will vibrate much more strongly, and this particular tongue or reed will be opposite the number 3000 of the scale 7, thus indicating that the shaft against which the point 19' is being held, is rotating at 3000 revolutions per minute.

Now let us assume that the shaft whose speed is to be measured, is rotating at 1500 revolutions per minute. In this case, if we leave the parts in the same position as above (scale 7, the "unit" scale, in operative position), none of the reeds 6 will respond by resonance, since 30 vibrations per second or 1800 per minute, is the lowest number to which any of the reeds is tuned. In such a case the switch 12 would be shifted to the next contact 13, that is to say, to the one which is connected with the plunger or brush 15 coöperating with the set containing two members 17. Thus, two current impulses will be sent through the circuit including the coils 10, for each revolution of the shaft 16'', or, in the case assumed (1500 revolutions) 3000 vibrations per minute will be imparted to the armature 7 and bar 1 with the reeds 6, causing one of these reeds (it happens to be the same as before) to respond by resonance, since the rate of impulses corresponds to its own normal rate of vibration. The shifting of the switch 12 has, however, brought the scale 7' into play, and the same reed which previously indicated 3000 revolutions, now indicates 1500, which is the correct indication of speed.

Similarly, in the case of still lower rotary speeds, the shaft 11' will be turned to bring other scales and the corresponding sets of members 17 into play, it being evident that at low speeds, we will use the sets of interrupters 17 having the greater number of members, so as to multiply the number of electrical impulses per revolution of the interrupter cylinder, and thus bring the number of such impulses within the range of normal vibrations to which the tongues or reeds 6 are tuned. It will, therefore, be understood that the range of measurements obtainable with this apparatus is greatly increased by the special construction of the interrupter with various sets of differently operating members 17, together with the several coöperating scales and the switch 12 arranged to make the proper change of connections each time a different scale is brought into position for use.

Various modifications may be made without departing from the nature of our invention as set forth in the appended claims.

We claim:

1. An apparatus of the character described, comprising supporting springs, a bar secured to said springs, an armature connected with said bar, an electro-magnet in operative relation to said armature, and a set of reeds connected with said bar and differing in their normal rates of vibration.

2. An apparatus of the character described, comprising parallel supporting springs, a bar secured to said springs and extending transversely thereof, a set of reeds connected with said bar and differing in their normal rates of vibration, and an electromagnetic device for producing vibrations, said device comprising two parts, viz.: an armature and an electro-magnet, one of said parts being stationary, and the other connected with said bar.

3. An apparatus of the character described, comprising supporting springs, a bar secured to said springs, a set of reeds connected with said bar and differing in their normal rates of vibration, and an electro-magnetic device for producing vibrations, said device comprising two parts, viz.: an armature and an electro-magnet, one of said parts being stationary and the other connected with said bar.

4. An apparatus of the character described comprising a movably supported bar, a set of parallel reeds connected with said bar and differing in their normal rates of vibration, an armature likewise connected with said bar and parallel to said reeds, and an electro-magnet in operative relation to said armature.

5. An apparatus of the character described, comprising a set of reeds differing in their normal rates of vibration, a plurality of scales movable selectively into coöperative relation to said reeds, a rotary interrupter having as many sections as there are scales, and contact-makers coöperating with said sections, the several interrupter sections differing as to the number of times they will establish contact with the respective contact-makers during one revolution of the interrupter, an electro-magnetic device for producing vibration of said reeds, an electrical circuit including a source of electricity and said electro-magnetic device and also including a plurality of branches, one for each section of the interrupters, and a switch operatively connected with said scales and arranged to shift the current to the particular interrupter section corresponding to the scale brought into operative position.

6. An apparatus of the character described, comprising a set of reeds differing in their normal rates of vibration, a plurality of scales movable selectively into coöperative relation to said reeds, a rotary current-variator having as many sections as there are scales, and individual contact-makers coöperating with the several sections, said sections differing as to the number of current-variations they will produce during one revolution of the current-variator, an electro-magnetic device for producing vibration of said reeds, an electrical circuit including a source of electricity and said electro-magnetic device and also including a plurality of branches, one for each section of the current-variator, and a switch operatively connected with said scales and arranged to shift the current to the particular current-variator section which corresponds to the scale brought into operative position.

7. An apparatus of the character described, comprising a set of indicators responding to electrical currents of different frequencies, a plurality of scales movable selectively into coöperative relation to said indicators, a movable current-variator having as many sections as there are scales, and individual contact-makers coöperating with the several sections, said sections differing as to the number of current-variations they will produce during an equal travel of the current-variator, an electrical device for operating said indicators, an electrical circuit which includes a source of electricity and said operating device and also includes a plurality of branches, one for each section of the current-variator, and a switch operatively connected with said scales and arranged to shift the current to the particular current-variator section which corresponds to the scale brought into operative position.

8. An apparatus of the character described, comprising a set of indicators responding to electrical currents of different frequencies, a plurality of scales movable selectively into coöperative relation to said indicators, a movable current-variator having as many sections as there are scales, and individual contact-makers coöperating with the several sections, said sections differing as to the number of current-variations they will produce during an equal travel of the current-variator, an electrical device for operating said indicators, an electrical circuit which includes a source of electricity and said operating device and also includes a plurality of branches, one for each section of the current variator, and a switch for connecting said electrical operating device selectively with the several sections of the current-variator.

9. An apparatus of the character described, comprising a set of indicators responding to electrical currents of different frequencies, a plurality of scales movable selectively into coöperative relation to said indicators, a movable current-variator having as many sections as there are scales, and individual contact-makers coöperating with the several sections, said sections differing as to the number of current-variations they will produce during an equal travel of the current-variator, an electrical device for operating said indicators, an electrical circuit which includes a source of electricity and said operating device and also includes a plurality of branches, one for each section of the current variator, and a switch for connecting said electrical operating device selectively with the several sections of the current-variator, the numbers on the different scales bearing to each other a ratio inverse to that of the number of current-variations corresponding to the several sections of the current-variator.

10. An apparatus of the character described, comprising a set of indicators responding to electrical currents of different frequencies, a plurality of scales movable selectively into coöperative relation to said indicators, a movable current-variator having as many sections as there are scales, and individual contact-makers coöperating with the several sections, said sections differing as to the number of current-variations they will produce during an equal travel of the current-variator, an electrical device for operating said indicators, an electrical circuit which includes a source of electricity and said operating device and also includes a plurality of branches, one for each section of the current-variator, and a switch operatively connected with said scales and arranged to shift the current to the particular current-variator section which corresponds to the scale brought into operative position, the numbers on the different scales bearing to each other a ratio inverse to that of the number of current-variations corresponding to the respective sections of the current-variator.

11. An apparatus of the character described, comprising a set of indicators tuned to different frequencies, a plurality of scales movable selectively into coöperative relation to said indicators, a movable frequency-variator having as many sections as there are scales, said sections differing as to the number of variations they will produce during an equal travel of said variator, a device for operating said indicators, operative connections between said device and the several sections of the frequency-variator, and a member operatively connected with said scales and arranged to connect said operating device with the particular variator section which corresponds to the scale brought into operative position.

12. An apparatus of the character described, comprising a set of indicators tuned to different frequencies, a plurality of scales movable selectively into coöperative relation to said indicators, a movable frequency-variator having as many sections as there are scales, said sections differing as to the number of variations they will produce during an equal travel of said variator, a device for operating said indicators, operative connections between said device and the several sections of the frequency-variator, and a member for connecting said operating device selectively with the several sections of the frequency-variator.

13. An apparatus of the character described, comprising a set of indicators tuned to different frequencies, a plurality of scales movable selectively into coöperative relation to said indicators, a movable frequency-variator having as many sections as there are scales, said sections differing as to the number of variations they will produce during an equal travel of said variator, a device for operating said indicators, operative connections between said device and the several sections of the frequency-variator, and a member for connecting said operating device selectively with the several sections of the frequency-variator, the numbers on the different scales bearing to each other a ratio inverse to that of the variations corresponding to the several sections of the variator.

14. An apparatus of the character described, comprising a set of indicators tuned to different frequencies, a plurality of scales movable selectively into coöperative relation to said indicators, a movable frequency-variator having as many sections as there are scales, said sections differing as to the number of variations they will produce during an equal travel of said variator, a device for operating said indicators, operative connections between said device and the several sections of the frequency-variator, and a member operatively connected with said scales and arranged to connect said operating device with the particular variator section which corresponds to the scale brought into operative position, the numbers on the different scales bearing to each other a ratio inverse to that of the number of the variations corresponding to the respective sections of the variator.

15. An apparatus of the character described, comprising a set of indicators tuned to different frequencies, a movable member provided with a plurality of scales adapted to be brought selectively into coöperative relation to said indicators, a movable frequency-variator having as many sections as there are scales, said sections differing as to the number of variations they will produce during an equal travel of said variator, a device for operating said indicators, and means for connecting said operating device selectively with the several sections of the variator.

16. An apparatus of the character described, comprising a set of indicators tuned to different frequencies, a movable member provided with a plurality of scales adapted to be brought selectively into coöperative relation to said indicators, a movable frequency-variator having as many sections as there are scales, said sections differing as to the number of variations they will produce during an equal travel of said variator, a device for operating said indicators, and means operatively connected with said scale-member and arranged to connect the said operating device with the particular variator section corresponding to the scale brought into operative position.

17. An apparatus of the character described, comprising a set of indicators tuned to different frequencies, a member arranged to turn adjacent to said indicators and provided with a plurality of scales adapted to be brought selectively into coöperative relation with said indicators, by turning said member, a movable frequency-variator having as many sections as there are scales, said sections differing as to the number of variations they will produce during an equal travel of said variator, a device for operating said indicators, and means for connecting said operating device selectively with the several sections of the variator.

18. An apparatus of the character described, comprising a set of indicators tuned to different frequencies, a member arranged to turn adjacent to said indicators and provided with a plurality of scales adapted to be brought selectively into coöperative relation with said indicators, by turning said member, a movable frequency-variator having as many sections as there are scales, said sections differing as to the number of variations they will produce during an equal travel of said variator, a device for operating said indicators, and means operatively connected with said scale-member and arranged to connect said operating device with the particular variator section corresponding to the scale brought into operative position.

19. An apparatus of the character described, comprising a set of reeds tuned to different frequencies, an electro-magnetic device for operating said reeds, a rotary interrupter and a source of electricity adapted to be in circuit with said device, said interrupter being adapted to be driven by a movable part and being also movable lengthwise of its axis to bring it into an operative or an inoperative position relatively to said circuit, and a spring for normally holding the interrupter in such inoperative position.

20. An apparatus of the character described, comprising a set of reeds tuned to different frequencies, an electro-magnetic device for operating said reeds, a rotary interrupter and a source of electricity adapted to be in circuit with said device, said interrupter being adapted to be driven by a movable part and being also movable lengthwise of its axis to bring it into an operative or an inoperative position relatively to said circuit.

21. An apparatus of the character described, comprising a set of indicators tuned to different frequencies, a device for operating said indicators, a rotary variator adapted to be driven by a moving part and also adapted for operative connection with said device, said variator being movable lengthwise of its axis to bring it into an operative or an inoperative position relatively to such connection, and a spring for normally holding the variator in such inoperative position.

22. An apparatus of the character described, comprising a set of indicators tuned to different frequencies, a device for operating said indicators, and a rotary variator adapted to be driven by a moving part and also adapted for operative connection with said device, said variator being movable lengthwise of its axis to bring it into an operative or an inoperative position relatively to such connection.

In testimony whereof we have hereunto set our hands.

HERMAN H. STICHT.
KARL GEORG FRANK.